March 17, 1970  J. W. EVANS  3,501,098
GAS BURNER FOR ROTARY DRYER DRUM
Filed June 28, 1968
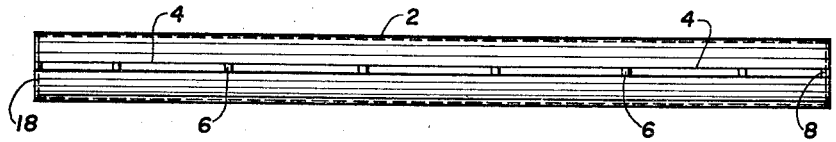
Fig 1
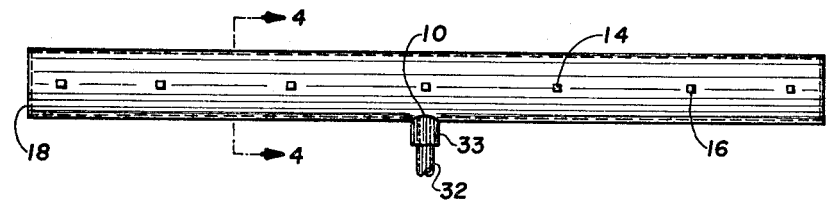
Fig 2
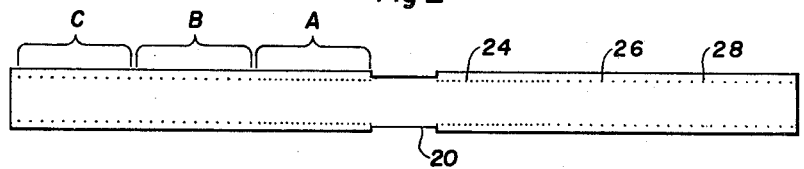
Fig 3
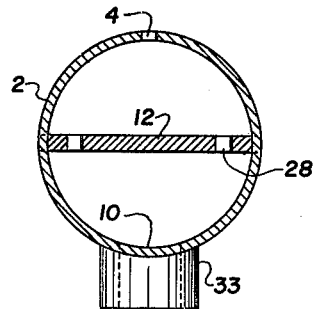
Fig 4
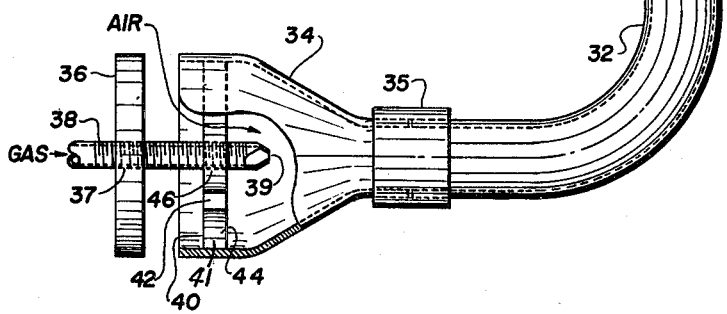
INVENTOR.
JOHN W. EVANS
BY
ATTORNEY

United States Patent Office 3,501,098
Patented Mar. 17, 1970

---

3,501,098
GAS BURNER FOR ROTARY DRYER DRUM
John W. Evans, Sunray, Tex., assignor to Continental Carbon Company, Houston, Tex., a corporation of Delaware
Filed June 28, 1968, Ser. No. 741,092
Int. Cl. F23d *13/40*
U.S. Cl. 239—561                    4 Claims

---

ABSTRACT OF THE DISCLOSURE

An efficient and long-lasting gas burner adapted for horizontal disposition is provided by an elongate and enclosed cylindrical manifold having in its topwall a series of longitudinally extending equidistantly spaced slots; a flat and coextensive plate disposed in the cylindrical manifold and secured to the sidewalls thereof; oppositely disposed and parallel apertures along but spaced inwardly of the side edges of the flat plate with the size and spacing of the apertures progressively increasing toward the ends thereof; and a fuel inlet in the bottom wall of the cylindrical manifold adjacent its transverse centerline.

---

BACKGROUND OF THE INVENTION

Field of the invention

The present invention relates to gaseous fuel burners for the combustion of pre-mixed fuel gas and air; and more particularly to devices of this type which are elongated and adapted to extend for a substantial distance beneath the object to be heated, such as rotary cylindrical dryer drum used in the production of carbon black.

Description of the prior art

The prior art developments in the burner field are numerous and it is known to use multiple gas burner elements to heat an extended area. It is also known to use baffles within the burner elements for gas and air distribution, however the devices of the art have not eliminated the problems in process heating applications. In various installations, and particularly rotary drum driers having a fire box extending therebeneath, it is difficult to provide an even heat along the entire length thereof; and the present invention seeks to provide a device which will provide continuous and even combustion over a relatively long horizontal distance.

SUMMARY OF THE INVENTION

The present invention comprises an improved gas burner for a rotary dryer drum to be horizontally disposed beneath the drum, said burner comprising an elongate and enclosed cylindrical manifold having a single series of spaced longitudinally extending slots aligned along the top wall of the manifold. Interiorly of the manifold is a substantially coextensive baffle plate secured to the side walls at about the center line of the manifold with said baffle plate having a rectangular recess on each side adjacent to the center and a series of oppositely disposed parallel apertures disposed along the inside of the edges with said manifold also having a means for supplying the combustion fuel mixture centrally to the portion of the manifold below the baffle plate.

An object of the invention is the provision of a structure which provides even heating over the length of the dryer and does not acquire excessive heat, so consequently is long lasting.

Another object is the provision of a gas burner of the class described which is easy and inexpensive to manufacture, install and maintain.

BRIEF DESCRIPTION OF THE DRAWING

The invention is more readily understood after referring to the description and attached drawing, wherein like numerals designate like parts, as follows:

FIGURE 1 is a top or plan view illustrating the cylindrical manifold and a series of longitudinally extending equidistantly spaced slots through which the combustible mixture of gas and air is fed immediately prior to its combustion;

FIGURE 2 is a side elevational view illustrating the elongate cylindrical manifold with fuel (gas and air) intake port in the bottom wall thereof, as well as the plug welds which support an interiorly disposed baffle plate to be later described;

FIGURE 3 is a plan view of the aforementioned baffle plate which is disposed coextensively within the elongate cylindrical manifold;

FIGURE 4 is a transverse elevational view, partly in section, which is taken on the line 4—4 of FIGURE 2, and which illustrate more fully the disposition of the baffle plate within the cylindrical manifold, and the means for supplying air and gas thereto.

DESCRIPTION OF THE PREFERRED EMBODIMENT

Referring more particularly to the drawings, the numeral 2 designates the elongate cylindrical manifold of the gas burner of the invention which may acceptably comprise Schedule 40 pipe of four inches diameter. The manifold 2 is enclosed by closure plates 18 affixed to end of the manifold, as by welding. In this description of the preferred embodiment references are made to specific dimensions and, though the invention is not understood to be limited thereby, these dimensions hereinafter relate to the manifold of Schedule 40 pipe four inches in inside diameter and ten and one-half feet in length.

The top surface of the pipe, or elongate cylindrical manifold 2 is provided with a slot 4 having spacers 6 disposed equidistantly therein. In the case of the aforementioned Schedule 40 pipe, the slot 4 may be continuously milled at a width of one-quarter of an inch, with spacers measuring one-quarter by one-quarter by three-quarters of an inch welded in the slot 4 on centers of nine inches for a pipe, for example, ten and one-helf feet in length. There may also be a one-quarter of an inch plug weld 8 at each end of the slot 4 adjacent closure plate 18.

Referring to FIGURE 2, the fuel inlet 10 in the bottom of the cylindrical manifold 2 is shown at the mid-section thereof, accordingly at the transverse centerline five feet and three inches from either end of the manifold.

A baffle plate 12 is disposed coextensively within the cylindrical manifold 2 and secured thereto at, or closely adjacent its horizontal centerline. This baffle plate 12 may, for the relative sizes referred to earlier herein, take the form of a flat bar of carbon steel of one-eighth inch thickness which is secured in position by plug welds 14. The welds extend through a series of slots 16 measuring three-eighths by one-half of an inch which are formed on centers of approximately eighteen inches in the opposite sidewalls of the cylindrical manifold, said slots to be formed by burning or other suitable means.

It will be noted that at the transverse center of the baffle plate 12, a rectangular recess 20 is provided on each edge which is approximately three-sixteenths of an inch deep and approximately four inches long and permits increased fuel flow within the cylindrical manifold 2 immediately above the fuel inlet 10.

As will be observed in FIGURE 3, the baffle plate 12 is provided along, but spaced inwardly of, its respective side edges with oppositely disposed and parallel groups of fuel flow apertures. These two lines of apertures comprise holes that increase in diameter and, to some extent, spacing from the transverse center of the baffle 12 toward the ends, that is from the point of fuel inlet 10 to closure members 18.

The groups or zones of fuel flow apertures in the baffle plate 12 are identified, from center outwardly, as A, B and C, and the apertures within the zones are indicated at 24, 26 and 28 respectively.

According to a specific embodiment which is based on the dimensions earlier referred to, the sizes and spacing arrangements of these fuel flow apertures in the baffle plate 12 may be set up in accordance with schedule of data in Table I below.

TABLE I

|  | Zone | | |
|---|---|---|---|
|  | A | B | C |
| Length of zone | 16 | 22 | 23 |
| Dimension of apertures | 3/8 | 7/16 | 1/2 |
| Center spacing of apertures within given zone | 1 | 2 | 2 |
| Center spacing of apertures from edge of baffle plate | 5/8 | 5/8 | 5/8 |

Measurement above in inches.

All of the aforementioned fuel flow apertures 24, 26 and 28 in the three zones A, B and C are on centers which are spaced five-eighth of an inch from the side edges of the baffle plate 12.

Referring to FIGURE 4, the mixture of gas and air is shown as supplied to the fuel inlet 10 of the cylindrical manifold 2 through a right-angularly extending conduit 32 affixed to manifold 2 by a connection means 33. Conduit 32 has a mixing chamber 34 affixed to the upstream end thereof by a suitable coupling 35. The mixing chamber 34 has a rigidly mounted spider means 40 mounted therein, having at least three contact points 41 affixed against the interior wall of the chamber. Passageways 44 are established by the void spaces between the points 41 of spider means 40 which extend from the space at the open or upstream end of chamber 34 and the interior thereof. The spider means has a threaded central aperture 46 adapted to receive gas pipe 38 which extends through and is rigidly supported to provide for centering of said pipe within the chamber 34.

The gas pipe has an opening 39 at its downstream end for introduction of gas fuel into the mixing chamber and the opposite end is suitable supported and connected to a gas supply (not shown). The downstream end of a section of pipe 38 as extending into chamber 34 is threaded to extend through aperture 46 and also to receive a disc 36 having a threaded central aperture 37. Disc 36 operable to regulate the flow of air into the mixing chamber. Adjustment of the location of the disc 36 in relation to the chamber 34 is accomplished by movement along the threaded section of pipe 38 which thereby controls the size of the space or opening between disc 36 and chamber 34 through which the air for the fuel mixture flows. The position of the gas pipe opening 39 can also be adjusted by utilization of the threaded relationship of pipe 38 and spider aperture 46.

When constructed in the manner described hereinbefore, the gas burner of the invention gives relatively perfect combustion, burning with a blue flame over wide ranges of gaseous fuel volumes. A typical fuel is a mixture of air and natural gas employed at a ratio of 11:1 volumes respectively, so that from about 300 to 1000 cubic feet per hour of natural gas or about 3600 to 12,000 of cubic feet per hour of fuel mixture, can be burned by this apparatus for a dryer drum.

The construction is particularly advantageous when used singly, or in a battery, in the fire box under a rotary drum dryer, as it proves an even heat for the entire length of the drum.

In operation the fuel gas, such as natural gas, is introduced under pressure into pipe 38 and through opening 39 into mixing chamber 34 while air is simultaneously introduced into the chamber about disc 36 and into the end of chamber 34, through passageways 44 for mixing with the gas in the chamber. After mixing combustible fuel so formed moved through conduit 32 and fuel inlet 10. The mixture passes through recesses 20 and apertures 24, 26 and 28 into the upper portion of manifold 2, and outwardly through slots 4 for combustion of the fuel evenly beneath a rotary dryer drum. The device operates at temperatures sufficiently cool to eliminate warping or burning of the manifold, as happens frequently with many of the devices of the prior art.

It will, of course, be understood that the device of the invention is not limited in overall size, and that the relative sizes discussed herein, which have been found to be very satisfactory, are principally for providing description with detail.

While I have shown and described certain specific embodiments of the present invention, it will be readily understood by those skilled in the art that I do not wish to be limited exactly thereto, since various modifications may be made without departing from the scope of the invention as defined in the appended claims.

What is claimed is:

1. A gas burner adapted for horizontal disposition and comprising, in combination:
   an elongate and enclosed cylindrical manifold having in its topwall a single series of aligned and substantially equally spaced longitudinally extending slots;
   a substantially coextensive baffle plate disposed within said cylindrical manifold and secured to the sidewalls at substantially the centerline of said manifold;
   each of the side edges of said baffle plate having a rectangular recess adjacent the center thereof;
   said baffle plate having a series of oppositely disposed parallel apertures disposed along but spaced inwardly of the remainder of its side edges;
   and means for supplying a combustible fuel mixture to that portion of said cylindrical manifold which is below said baffle plate.

2. The combination of claim 1 wherein the means for supplying the combustible fuel mixture is disposed in the bottom wall of said elongate cylindrical manifold and adjacent the center thereof.

3. The combination of claim 1 wherein the sidewalls of the said elongate cylindrical manifold are provided with oppositely disposed and parallel substantially evenly spaced slots; and plug welds extend through said last-named slots for securing said baffle plate in position.

4. The combination of claim 1 wherein the apertures in said baffle plate are arranged in a plurality of zones of progressively increasing length toward its ends with the size of the apertures increasing from the mid-section of said baffle plate outwardly but of approximately the same size within each of the counterparts of said zones.

References Cited

UNITED STATES PATENTS

| 678,624 | 7/1901 | McKallip | 239—553 XR |
| 1,173,547 | 2/1916 | Bartlebaugh | 239—553 XR |
| 1,533,909 | 4/1925 | Ferguson | 239—553 XR |

M. HENSON WOOD, JR., Primary Examiner

G. A. CHURCH, Assistant Examiner

U.S. Cl. X.R.
239—553; 431—354